(12) United States Patent
Brahmaroutu et al.

(10) Patent No.: US 8,681,788 B2
(45) Date of Patent: Mar. 25, 2014

(54) ACCELERATING NDMP BASED VIRTUAL TAPE LIBRARY OPERATIONS

(75) Inventors: Surender V. Brahmaroutu, Round Rock, TX (US); Eric Endebrock, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1976 days.

(21) Appl. No.: 11/412,147

(22) Filed: Apr. 26, 2006

(65) Prior Publication Data

US 2008/0002694 A1    Jan. 3, 2008

(51) Int. Cl.
*H04L 12/28*    (2006.01)

(52) U.S. Cl.
USPC .......................................... 370/392; 711/111

(58) Field of Classification Search
USPC .......................................... 370/392; 711/111
See application file for complete search history.

(56) References Cited

U.S. PATENT DOCUMENTS

| | | | |
|---|---|---|---|
| 6,067,481 A | 5/2000 | Saliba et al. | |
| 6,324,497 B1 | 11/2001 | Yates et al. | |
| 6,463,513 B1 | 10/2002 | Bish et al. | |
| 6,779,077 B1 | 8/2004 | Bakke et al. | |
| 6,845,431 B2 | 1/2005 | Camble et al. | |
| 6,851,031 B2 | 2/2005 | Trimmer et al. | |
| 6,862,656 B2 | 3/2005 | Trimmer et al. | |
| 6,954,768 B2 | 10/2005 | Carlson et al. | |
| 6,954,831 B2 | 10/2005 | Carlson et al. | |
| 6,957,291 B2 | 10/2005 | Moon et al. | |
| 7,308,528 B2 * | 12/2007 | Kitamura et al. | 711/111 |
| 2006/0123189 A1 * | 6/2006 | Bitner et al. | 711/111 |
| 2008/0301363 A1 * | 12/2008 | Kitamura et al. | 711/111 |

* cited by examiner

*Primary Examiner* — Albert T Chou
(74) *Attorney, Agent, or Firm* — Haynes and Boone, LLP

(57) ABSTRACT

For backing up of data from a source to a destination, a virtual tape library (VTL) appliance intercepts a message for backing up the data. In response to the intercepted message, the VTL appliance sends a command to initiate the backing up of the data. A network attached storage (NAS) server, which is the source of the data and is coupled to the VTL appliance by a network, receives the command. An agent located in the NAS server is triggered in response to the command to directly transfer the data from the source to the destination. The agent informs the VTL appliance upon completion of the transfer of the data.

7 Claims, 4 Drawing Sheets

ACCELERATING NDMP BASED VIRTUAL TAPE LIBRARY OPERATIONS

BACKGROUND

The present disclosure relates to the field of data storage systems, and more particularly to efficient archiving and/or restoring of data handled by an information handling system.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, entertainment, and/or global communications. In addition, IHSs may include a variety of hardware and software components that may be configured to process, store, and communicate information and may include one or more computer systems, data storage systems, and networking systems.

It is common to backup, vault, and/or archive data that may be processed, compiled, accessed, stored, and/or communicated by an IHS. The data may be backed up for later use by a restore process. Data backup and/or restore may be desired for reasons such as security, disaster recovery, regulatory and similar others. Many corporate information technology (IT) network administrators may designate one or more backup computers or servers to perform the data back up function. Traditionally, the data to be backed up has been archived on removable magnetic media such as tape cartridges for long term data storage.

Presently, data storage devices such as hard disk drives (HDD) are gaining wider acceptance for use in data archiving applications due to their declining costs and improved performance, especially compared to the tape drives. There are many commercially available hardware/software products such as a virtual tape library (VTL) appliance or a disk-to-disk storage appliance, which use the performance and reliability of the disk drives. The VTL appliance provides a virtually seamless integration of existing tape libraries by intercepting and archiving data that is directed to be stored on tape libraries. Thus, the VTL appliance appears like a tape library to a backup software application, enabling the user to continue using existing software and procedures for archiving. However, the VTL appliance often becomes a bottle neck for communications since all messages and/or information packets are intercepted by the VTL appliance and thus pass through the VTL appliance.

Therefore, a need exists to efficiently archive data that is directed to be stored on storage systems, including tape libraries. Accordingly, it would be desirable to provide for improved throughput in data archiving in an IHS, absent disadvantages, some of which have been discussed above.

SUMMARY

The foregoing need is addressed by the teachings of the present disclosure, which relates to efficient archiving of data. According to one embodiment, for improved backing up of data from a source to a destination, a VTL appliance intercepts a message for backing up the data. In response to the intercepted message, the VTL appliance sends a command to initiate the backing up of the data. A network attached storage (NAS) server, which is the source of the data and is coupled to the VTL appliance by a network, receives the command. An agent located in the NAS server is triggered in response to the command to directly transfer the data from the source to the destination. The agent informs the VTL appliance upon completion of the transfer of the data.

In one aspect, the VTL appliance for backing up data from a source to a destination includes an interceptor to intercept a message for backing up the data. The message includes a source pointer to the source and a destination pointer to the destination. A communicator sends a command to initiate the backing up of the data in response to the message. An agent located at the source is operable to directly transfer the data from the source to the destination in response to the agent receiving the command.

Several advantages are achieved according to the illustrative embodiments presented herein. The embodiments advantageously provide an efficient method and system for data archiving in an IHS by empowering a filer device such as an NAS device to perform at least one function that is performed by the VTL appliance. Thus, the NAS device, which is the source of the data, is empowered by having an agent that is configured to directly transfer the data from the source to the destination, without the involvement of the VTL appliance. By advantageously configuring the agent to perform the direct transfer of data, the loading on the VTL appliance is reduced and the performance of the data archiving system is improved.

DETAILED DESCRIPTION

Figure 1:
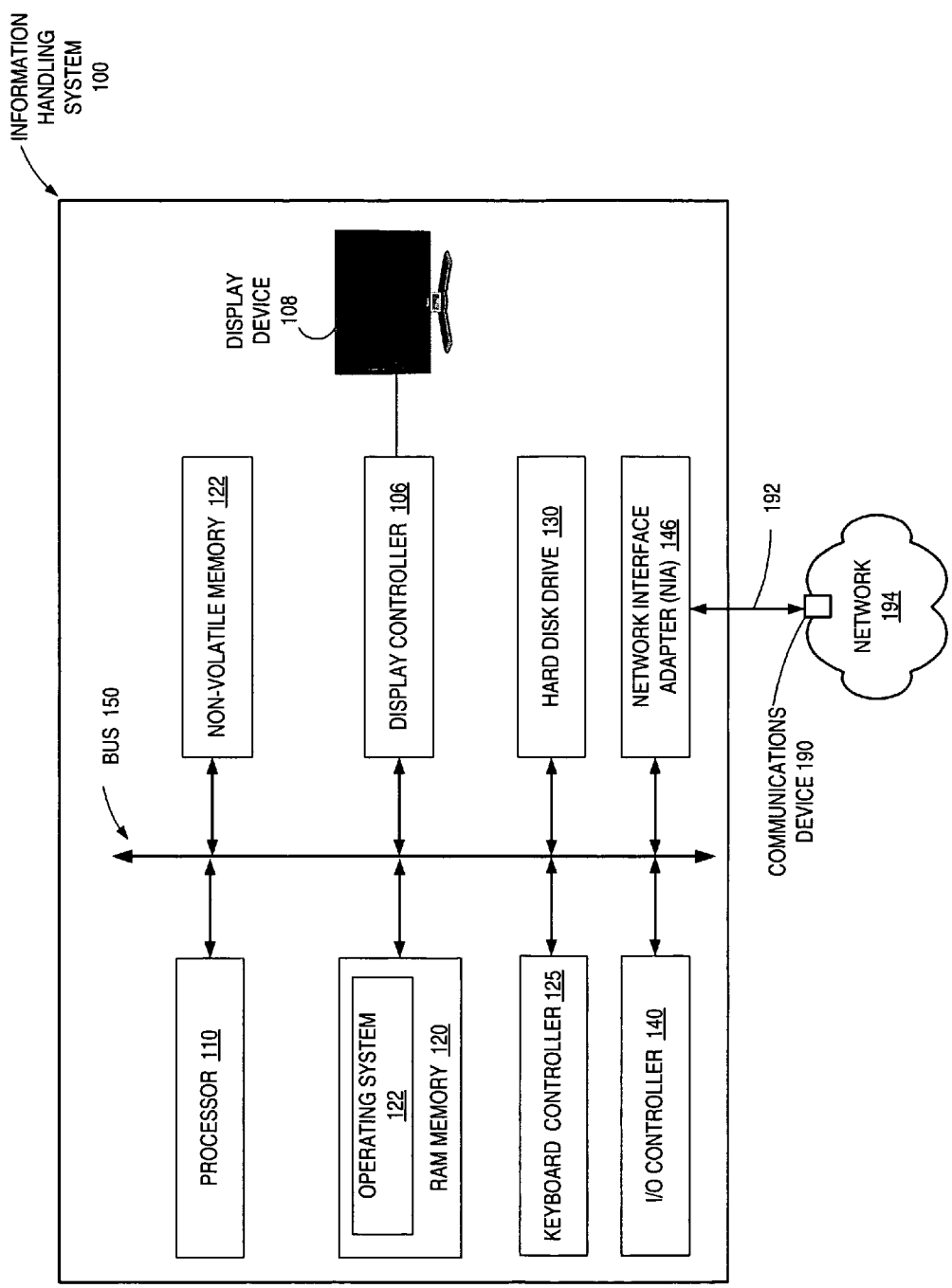
FIG. 1 illustrates a block diagram of an IHS, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

As described earlier, many commercially available VTL appliances appear as a legacy tape library to a backup server, thereby maintaining compatibility with existing software and data archiving procedures. However, the VTL appliance often becomes a bottleneck for communications because all messages and/or information packets are intercepted by the VTL appliance and thus pass through the VTL appliance. Therefore, a need exists to efficiently archive data that is directed to be stored on tape libraries. According to one embodiment, for improved backing up of data from a source to a destination, a VTL appliance intercepts a message for backing up the data. In response to the intercepted message, the VTL appliance sends a command to initiate the backing up of the data. An NAS server, which is the source of the data and is coupled to the VTL appliance by a network, receives the command. An agent located in the NAS server is triggered in response to the command to directly transfer the data from the source to the destination. The agent informs the VTL appliance upon completion of the transfer of the data.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including desktop computers, servers, notebook computers, personal digital assistants, cellular phones, gaming consoles, a network storage device, or any other suitable device and may vary in size, shape, performance, functionality, and price. The IHS may include random access memory (RAM), one or more processing resources such as central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to receive/transmit communications between the various hardware components.

FIG. 1 illustrates a block diagram of an IHS 100, according to an embodiment. The IHS 100 includes a processor 110, a system RAM 120 (also referred to as main memory), a non-volatile memory (NVM) 122 memory, a display controller 106 coupled to a display device 108, a keyboard controller 125, and an I/O controller 140 for controlling various other I/O devices. For example, the I/O controller 140 may include a cursor device controller and/or a serial I/O controller. It should be understood that the term "information handling system" is intended to encompass any device having a processor that executes instructions from a memory medium.

The IHS 100 is shown to include a hard disk drive 130 connected to the processor 110, although some embodiments may not include the hard disk drive 130. In a particular embodiment, the IHS 100 may include additional hard disks. The processor 110 communicates with the system components via a bus 150, which includes data, address and control lines. In one embodiment, the IHS 100 may include multiple instances of the bus 150. In an exemplary, non-depicted embodiment, not all devices shown may be directly coupled to the bus 150. The multiple instances of the bus 150 may be in compliance with one or more proprietary standards and/or one or more industry standards such as PCI, PCIe, ISA, USB, SMBus, and similar others.

A network interface adapter (NIA) 146 may be connected to the bus 150 to exchange information between the IHS 100 and a network 194. The network 194 includes a communications device 190 such as a network switch, a router, a bridge, and/or another computer to electrically couple the IHS 100 and the network 194. The NIA 146 may be coupled to the communications device 190 via a wired and/or wireless communications link 192. In an exemplary, non-depicted embodiment, the information exchange may include backing up of data from a source, such as a storage server, to a destination, such as a VTL appliance. Also, the IHS 100 may include additional NIA cards. Additional detail of a data archiving system using the IHS 100 is described with reference to FIG. 2.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) 122 of the IHS 100 is a type of software program that controls execution of other software programs, referred to as application software programs. As described earlier, an agent is an example of an application software program. In various embodiments the instructions and/or software programs may be implemented in various ways, including procedure-based techniques, component-based techniques, and/or object-oriented techniques, among others. Software may also be implemented using C, XML, C++ objects, Java and Microsoft's .NET technology.

Figure 2:
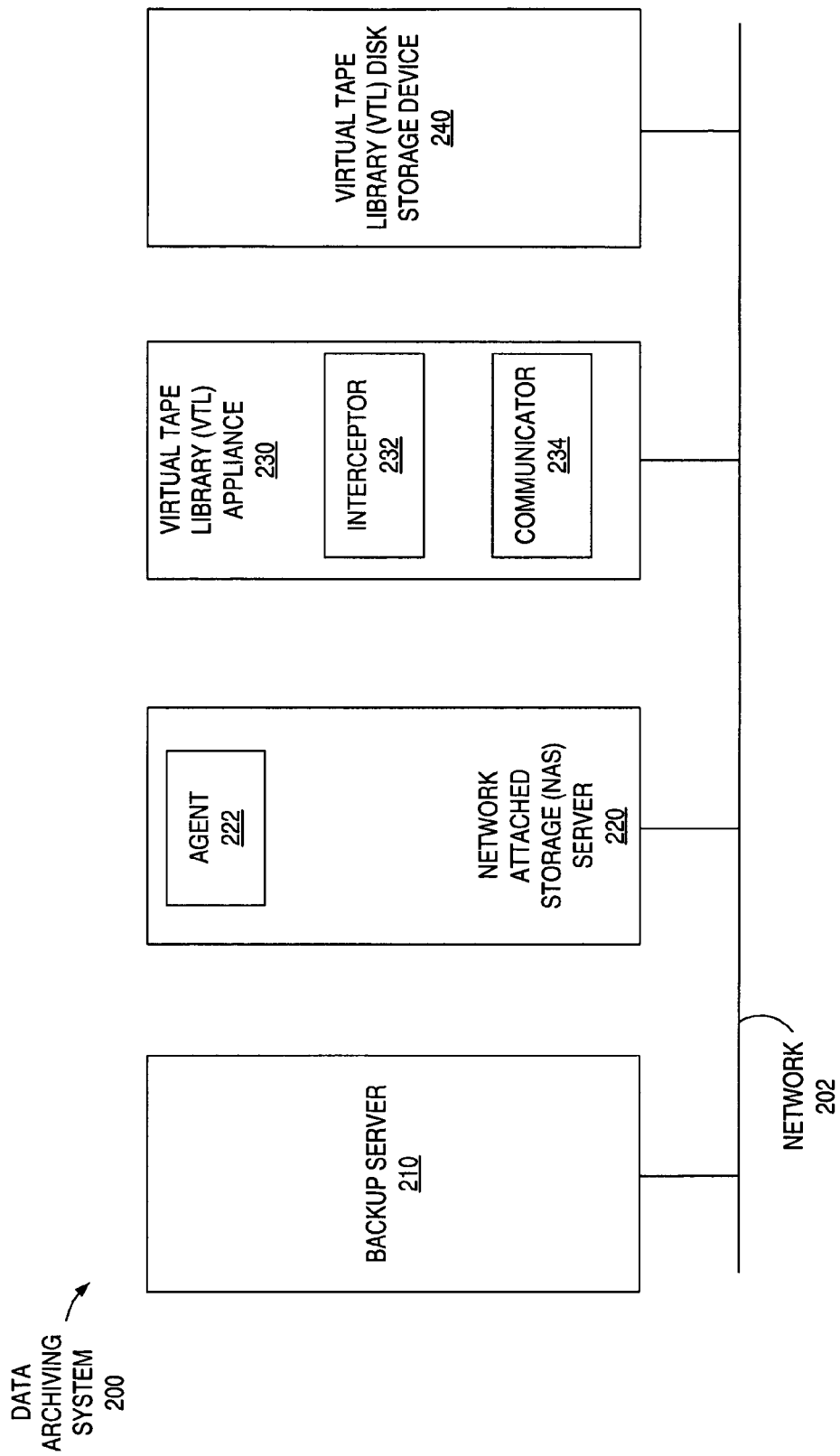
FIG. 2 illustrates a block diagram of a data archiving system, according to an embodiment.

FIG. 2 illustrates a block diagram of a data archiving system 200, according to an embodiment. The data archiving system 200 represents another configuration of an IHS that is used for data archiving. In the depicted embodiment, the data archiving system 200 includes a network 202 to couple a backup server 210, an NAS server 220, a VTL appliance 230, and a VTL disk storage device 240. In an embodiment, each one of the devices coupled to the network 202 may be implemented as the IHS 100 described with reference to FIG. 1. In this embodiment, the network 202 is substantially the same as the network 194. In a particular embodiment, the network 202 may include a fiber channel (FC) network, an IP (Internet Protocol) network, a storage area network (SAN), an iSCSI network and/or a combination thereof.

In a particular embodiment, the data archiving system 200 uses a client/server architecture that is operable in compliance with a network data management protocol (NDMP) standard for archiving data. NDMP is an open standard protocol for enterprise-wide backup of heterogeneous network-attached storage.

The backup server 210, which may be one of several backup servers within a larger IHS, is operable as a client to send a message for backing up data (data that is to be archived or backed up may also be referred to as 'payload' data) from a source to a destination. The message includes a source pointer to the source of the data and a destination pointer to the destination of the data. The message may be generated by an occurrence of an event such as an execution of a task or a program. The event may be manually or automatically triggered such as by the action of an IT or network administrator, by another program, and/or by a time schedule. In the depicted embodiment, the source of the payload data is the NAS server 220 and the destination for the payload data is the VTL disk storage device 240. The VTL appliance 230 includes an interceptor 232 to intercept messages directed to the destination, interpret the content within each message, and send a command via a communicator 234 to perform an action in response to the content. The action may include initiating the backing up of the data.

The data archiving system 200 may be operable in a plurality of operating states such as active, idle, paused and halted. Additional detail of the operation of the data archiving system 200 in the plurality of states is described with reference to FIG. 3. Messages sent and/or received by devices within the data archiving system 200 may be categorized into four types of programming interfaces, such as CONNECT, SCSI, CONFIG and TAPE. These messages, which may be referred to as control related traffic, are intercepted and processed by the VTL appliance 230. The messages may also include a DATA interface, which describes the format of the backup data. The backup server 210 transfers data using the DATA interface. These messages (as well as actions and errors) may trigger state changes for the data archiving system 200, e.g., change state from active to a halted state.

In a particular embodiment, an agent 222 is initially configured or set up to communicate with the VTL appliance 230 (using industry standards and/or proprietary standards) via the communicator 234 to perform at least one function performed by the VTL appliance 230. Although not shown, additional agents may be configured with each agent performing at least one function. After the initial configuration the agent 222 is loaded to be executed at the source, e.g., NAS server 220. Specifically, the agent 222, which may be considered to be an extension of the VTL appliance 230, is operable to receive and process the DATA interface related commands sent by the VTL appliance 230. These commands may include instructions for directly transferring the payload data from the source, e.g., the NAS server 220, to the destination, e.g., the VTL disk storage device 240. The direct transfer of the payload data without using the VTL appliance 230 as a hop, as an intermediate device, and/or as a store-and-forward device may be described as an out-of-band transaction. Such out-of-band transactions advantageously reduce the latency time, improve the performance, and increase the throughput of the data archiving process. Thus, at least a portion of the intelligence in the VTL appliance 230 may be distributed to the source, such as the NAS filers, in the form of VTL agents that are configured to handle out-of-band transactions. The agent 222 is thus delegated to process the out-of-band transactions, such as the DATA interface, thereby off loading the VTL appliance 230 to perform other functions such as intercepting control related traffic. Though the agent 222 is located at the NAS server 220, the agent 222 by itself is an extension of the VTL appliance 230. Additional detail of the DATA interface commands processed by the agent 222 is described with reference to FIG. 3.

Figure 3:
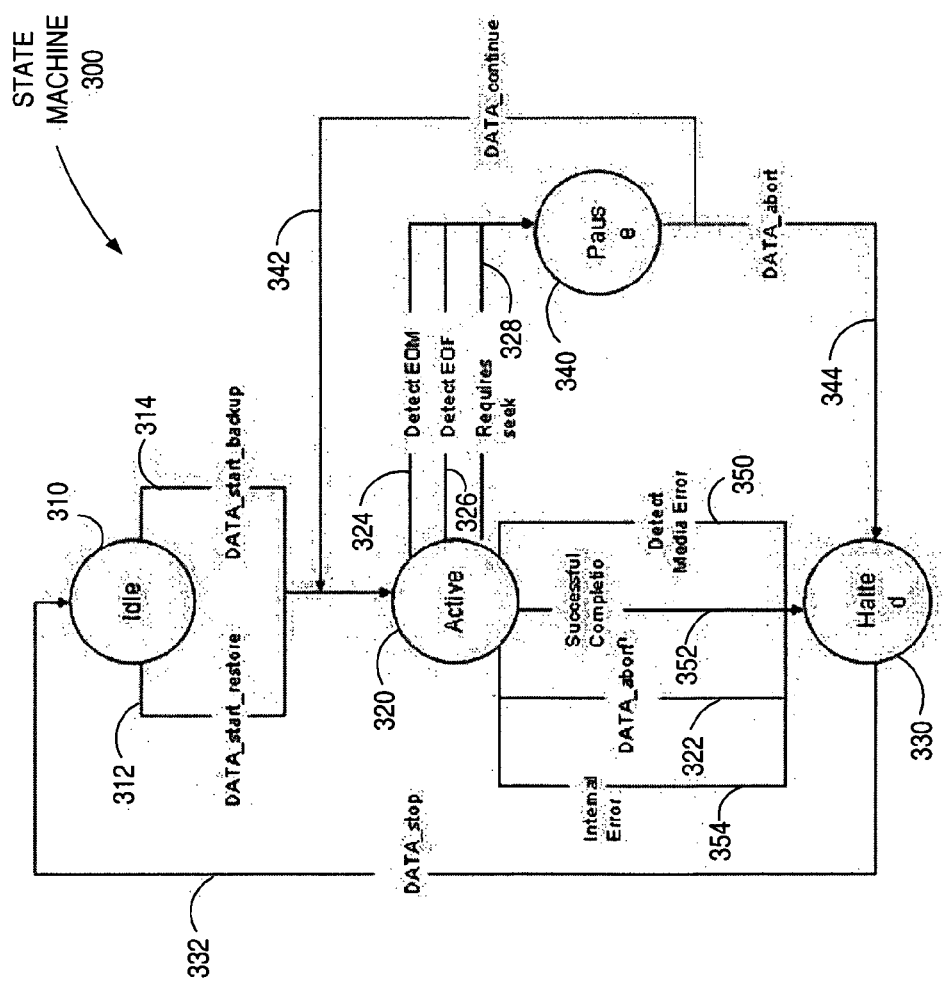
FIG. 3 illustrates a state machine for controlling transition states of a data archiving system described with reference to FIG. 2, according to an embodiment.

FIG. 3 illustrates a state machine 300 for controlling the transition states of the data archiving system 200 described with reference to FIG. 2, according to an embodiment. In a particular embodiment, the logic associated with the state machine 300 is controlled by the VTL appliance 230 working in cooperation with the agent 222. In the depicted embodiment, the state machine 300 controls four operating states: an idle 310 state, an active 320 state, a halted 330 state and a paused 340 state of the data archiving system 200. The state machine 300 also defines a sequence of transitions among the various operating states, based on occurrence of certain events, conditions, inputs and outputs, actions and errors. For example, upon a successful completion of a backing up operation, the state machine 300 transitions from the active state 320 to the halted 330 state. In a particular embodiment, the state machine 300 operates in compliance with the NDMP protocol.

In a particular embodiment, commands included in the DATA interface which may be used to transition between the various operating state, are: DATA_stop 332, DATA_start_restore 312, DATA_start_backup 314, DATA_continue 342, DATA_abort 344, and DATA_abort 322. In an embodiment, the agent 222 is configured to send, receive, process, and/or execute these commands to directly transfer payload data from the source, e.g., NAS server 220, to the destination, e.g., the VTL disk storage device 240. In this embodiment, the DATA interface related events and operations that are identified above are advantageously handled out-of-band while maintaining compliancy with the NDMP protocol. The agent 222 communicates with the VTL appliance 230 to exchange control related traffic information such as status of the data transfer. Other control related commands or status flags shown are: Detect_EOM 324, Detect_EOF 326, Requires_seek 328, Detect_media_error 350, Successful completion 352, and Internal_error 354. Messages which include any of these control related commands or status flags are intercepted and processed by the VTL appliance 230.

Figure 4:
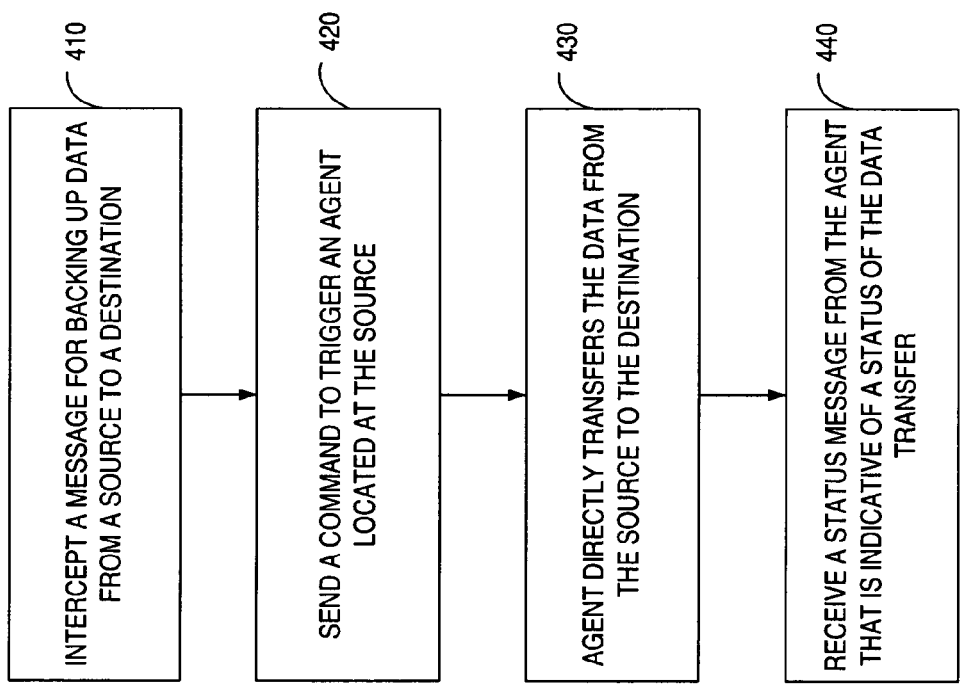
FIG. 4 is a flow chart illustrating a method for backing up data from a source to a destination, according to an embodiment.

FIG. 4 is a flow chart illustrating a method for backing up data from a source to a destination, according to an embodiment. In a particular embodiment, the method for backing up data from the source to the destination may be implemented by using the data archiving system 200 described with reference to FIG. 2. At step 410, a message for backing up the data, e.g., the payload data, is intercepted. The message includes a source pointer to the source and a destination pointer to the destination. At step 420, a command is sent to trigger an agent located at the source in response to the intercepted message. The agent is configured to directly transfer the data from the source to the destination. At step 430, the data is transferred directly from the source to the destination in response to the agent being triggered.

Various steps described above may be added, omitted, combined, altered, or performed in different orders. In a particular embodiment, a step 440 may be added for receiving a status message from the agent 222, wherein the status message is indicative of a status of the data transfer.

The illustrative embodiments advantageously provide for empowering a user to optimize the task of performing a backing up or restoring of data in an IHS. The improved method and system advantageously empower a filer device such as an NAS device to perform at least one function that is performed by a VTL appliance. Thus, the NAS device, which is the source of the data, is empowered by having an agent that is configured to directly transfer the data from the source to the destination, without the involvement of the VTL appliance. By advantageously configuring the agent to perform the direct transfer of data, the loading on the VTL appliance is reduced and the performance of the data archiving system is improved.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Virtual Tape Library (VTL) data archiving system, comprising:
   a VTL appliance, a data source server including a data source storage device, and a data destination storage device that are each coupled to each other through a network such that the data source storage device and the data destination storage device are coupled together through the network, wherein the data source storage device comprises a plurality of data; and
   an agent that is loaded on the data source server;
   wherein the VTL appliance is operable to intercept a backup message that include pointers to the data source server and the data destination storage device and send a command to the agent, and wherein in response to receiving the command, the agent transfers at least some of the plurality of data directly from the data source storage device to the data destination storage device over the network.

2. The system of claim 1, wherein the VTL appliance and the agent communicate to control a plurality of operating states of the system while complying with a network data management protocol (NDMP) standard for archiving data, and wherein the command comprises a DATA interface command that is used to transition between the plurality of operating states.

3. The system of claim 1, further comprising:

a backup server that is coupled to the VTL appliance through the network and operable to send the backup message.

4. The system of claim 1, wherein the network comprises a network selected from the group consisting of a fiber channel network, an Internet Protocol network, a storage area network, an iSCSI network, and combinations thereof.

5. An Virtual Tape Library (VTL) data archiving method, comprising:

providing a data source server that includes a data source storage device and that is coupled to a data destination storage device through a network such that the data source storage device and the data destination storage device are coupled together through the network, wherein the data source storage device comprises a plurality of data;

sending a backup message that include pointers to the data source server and the data destination server;

intercepting the backup message by a VTL appliance, wherein in response to intercepting the backup message, the VTL appliance sends a command to an agent that is loaded on the data source server; and transferring at least some of the plurality of data directly from the data source storage device to the data destination storage device over the network by the agent in response to receiving the command.

6. The method of claim 5, wherein the network comprises a network selected from the group consisting of a fiber channel network, an Internet Protocol network, a storage area network, an iSCSI network, and combinations thereof.

7. The method of claim 5, further comprising:

controlling a plurality of operating states through communication between the VTL appliance and the agent while complying with a network data management protocol (NDMP) standard for archiving data, wherein the sending the command comprises sending a DATA interface command that is used to transition between the plurality of operating states.

* * * * *